Figure 5:
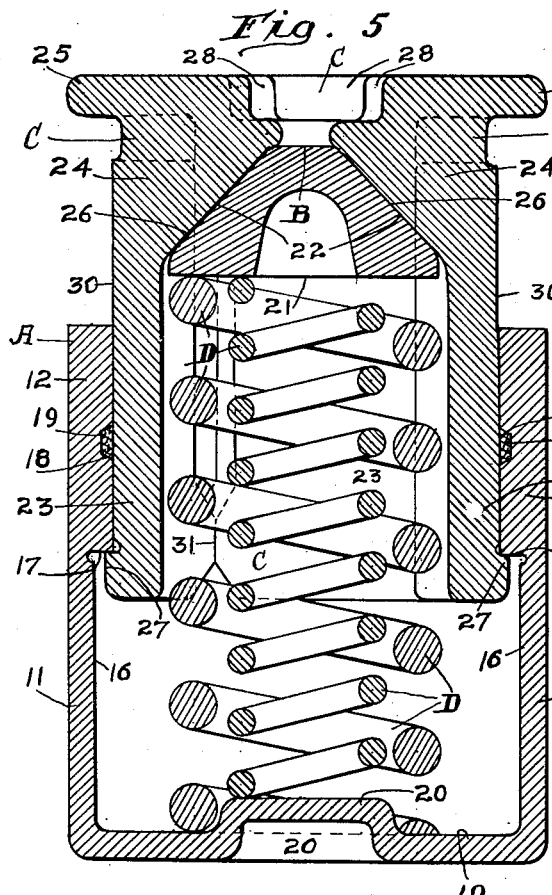

June 26, 1951 W. E. WITHALL 2,558,117
FRICTION SHOCK ABSORBER FOR RAILWAY CAR TRUCKS
Filed Aug. 15, 1949 2 Sheets-Sheet 1
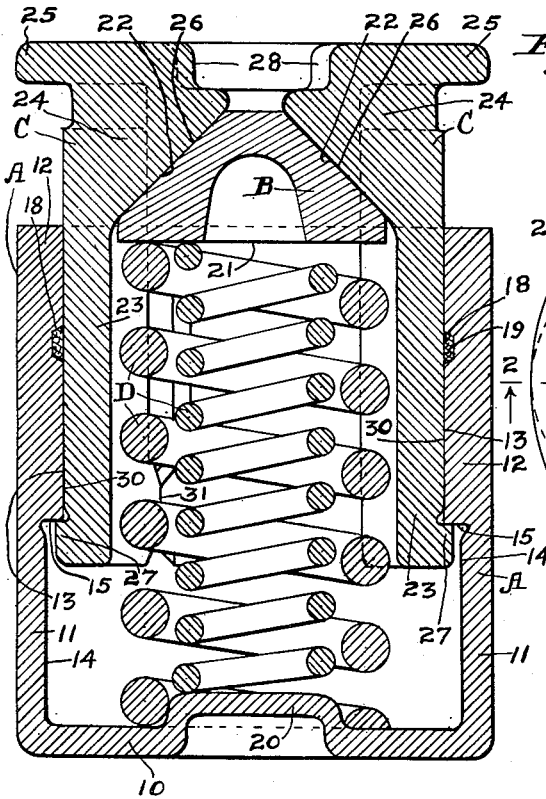
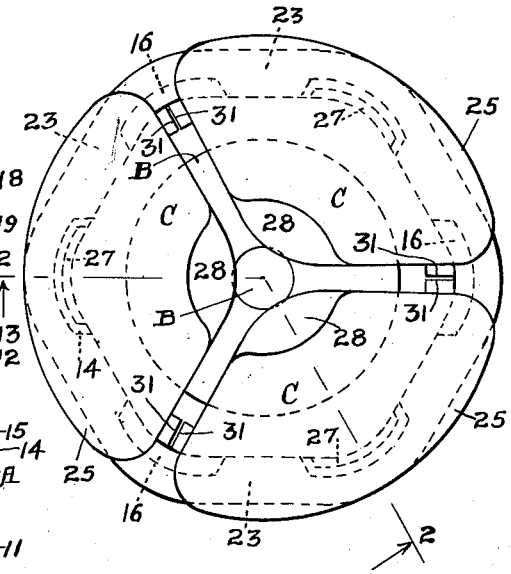
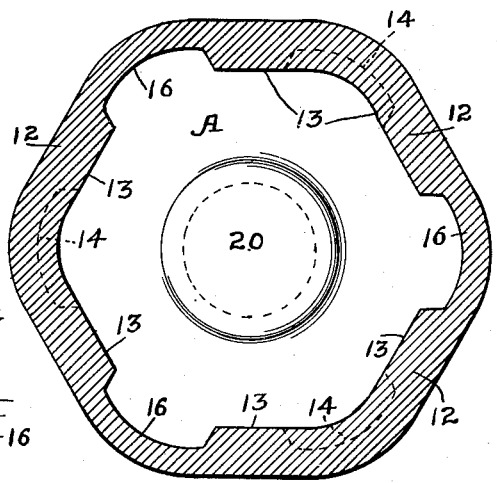
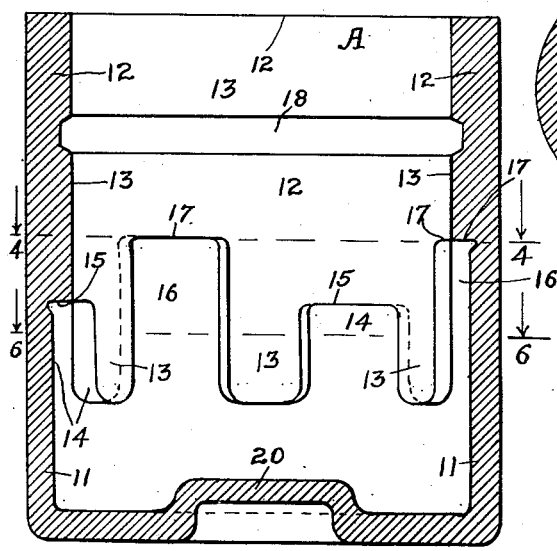
Inventor.
William E. Withall.
By Henry Fuchs.
Atty.

Inventor:
William E. Withall.
By Henry Fuchs
Atty.

Patented June 26, 1951

2,558,117

UNITED STATES PATENT OFFICE 2,558,117

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application August 15, 1949, Serial No. 110,406

6 Claims. (Cl. 267—9)

This invention relates to improvements in friction shock absorbers especially adapted for use in connection with railway car truck springs for snubbing or dampening the action of the same.

One object of the invention is to provide a friction shock absorber having relatively high capacity and smooth action adapted for use as a snubbing device for railway car truck springs.

Another object of the invention is to provide a friction shock absorber of the character indicated, which is readily adjustable in overall length.

A further object of the invention is to provide a friction shock absorber for snubbing the action of railway car truck springs, comprising a friction casing, friction shoes slidingly telescoped within the casing and receiving the actuating force, a combined spring follower and wedge in wedging engagement with the shoes, and a spring resistance within the casing yieldingly opposing inward movement of the combined spring follower and wedge.

Still another object of the invention is to provide a friction shock absorber as set forth in the preceding paragraph, wherein the shoes have shouldered engagement with the casing to limit outward movement of the shoes and to hold the mechanism of uniform overall length.

Yet another object of the invention is to provide a friction shock absorber comprising a friction casing, a friction clutch including friction shoes slidingly telescoped within the casing and projecting from the casing to receive the actuating force, and a combined wedge and follower block in wedging engagement with the shoes, and a spring within the casing yieldingly opposing inward movement of the combined wedge and follower block, wherein interengaging means in the form of laterally projecting guide lugs are provided on the inner end portions of the shoes to hold the same spread apart and thereby prevent collapse of the inner end of the clutch.

A more specific object of the invention is to provide in a friction shock absorber, comprising a casing and a yieldingly resisted friction clutch, including friction shoes which are adapted to receive the actuating force, simple means for effecting adjustment of the overall length of the mechanism, comprising stop lugs on the shoes and internal shoulders on the casing, which are arranged in sets, staggered with respect to each other lengthwise of the casing, with either of which respective sets the lugs of the shoes are engageable to halt outward movement of the shoes in different positions of adjustment.

Other objects of the invention will more clearly appear from the description and claims hereinafter following.

Figure 7:
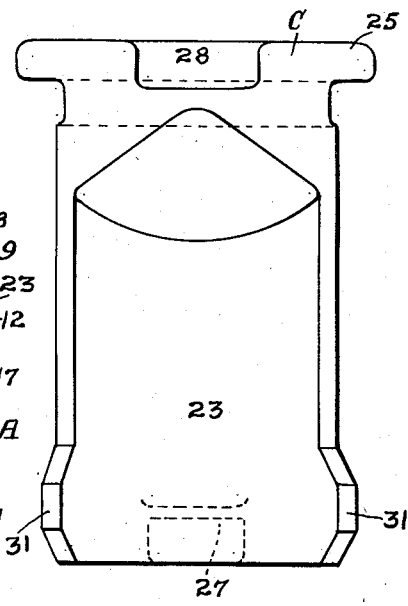
Figure 6:
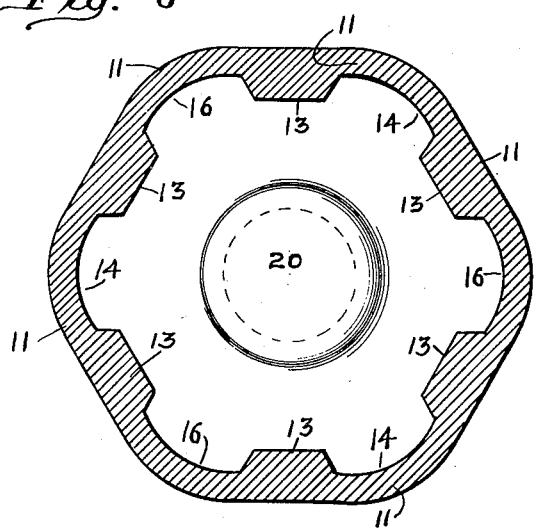
Figure 8:
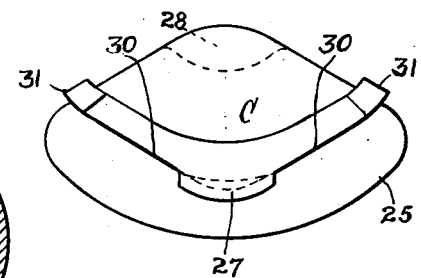

In the accompanying drawings forming a part of this specification, Figure 1 is a top plan view of my improved shock absorber. Figure 2 is a transverse, vertical sectional view, on two intersecting planes at an angle of 120 degrees with respect to each other, corresponding substantially to the line 2—2 of Figure 1. Figure 3 is a transverse, vertical sectional view of the friction casing only of the shock absorber as shown in Figure 4. Figure 4 is a horizontal sectional view, corresponding substantially to the line 4—4 of Figure 3. Figure 5 is a vertical sectional view, on two intersecting vertical planes at an angle of 120 degrees with respect to each other, showing the mechanism adjusted to a height different from that illustrated in Figure 2. Figure 6 is a horizontal sectional view, corresponding substantially to the line 6—6 of Figure 3. Figure 7 is an elevational view of the right hand friction shoe shown in Figure 2, looking from left to right in said figure. Figure 8 is a bottom plan view of Figure 7.

As shown in the drawings, my improved shock absorber comprises broadly a friction casing A, a combined wedge and spring follower B, three friction shoes C—C—C, and a spring resistance D.

The casing A is in the form of a tubular member of hexagonal, horizontal, transverse cross section, open at its top end and having a transverse wall 10 at its bottom end. The six walls of the casing are indicated, respectively, by 11—11—11—11—11—11.

At the top end portion of the casing, the side walls are inwardly thickened to provide a friction shell section 12, presenting interior friction faces 13—13—13—13—13—13, adjacent faces 13—13 together forming friction surfaces of V-shaped, transverse cross section. As shown in Figure 2, the friction faces 13 extend lengthwise of the mechanism, parallel to the central longitudinal axis of the casing. At three alternate corners of the shell section 12, the casing is provided with relatively short, vertical guide slots 14—14—14, which extend upwardly from the lower ends of the friction faces of the shell section. The transverse upper end wall of each of these slots provides a transverse stop shoulder 15 for a purpose hereinafter described.

At the remaining three alternate corners of the shell section 12, additional vertically extending guide slots 16—16—16 are provided which extend upwardly from the lower ends of the friction faces of the shell section, and terminate above the upper ends of the slots 14—14—14. The transverse upper end wall of each slot 16 provides a transverse stop shoulder 17, which is at a level above the shoulders 15—15—15. In other words, the stop shoulders 15 and 17 are staggered with respect to each other. The interior of the friction shell section 12, at a point below the upper end thereof, is preferably provided with an inwardly opening, horizontal groove 18 filled with lead 19 or a similar material for lubricating the engaging friction surfaces of the shoes and casing. The bottom wall 10 of the casing is upwardly offset at the center to provide a hollow boss 20, adapted to accommodate the usual spring centering projection of the bottom spring follower plate of the truck spring cluster of a railway car.

The combined wedge and spring follower B is in the form of a block having a flat, transverse bottom end face 21. The upper end portion of the block B is provided with three upwardly converging flat wedge faces 22—22—22. The wedge faces 22—22—22 are arranged symmetrically about the central, longitudinal axis of the casing and have wedging engagement with the shoes C—C—C.

The friction shoes C are three in number and are interposed between the combined wedge and spring follower B and the V-shaped, interior friction surfaces of the casing, each formed by two adjacent friction faces 13—13 of the shell section 12. Each shoe C comprises a relatively heavy, platelike section 23 of V-shaped, transverse cross section, and an inward enlargement or head 24 at the upper end of the section 23. At the upper end thereof, the head portion 24 presents a laterally outwardly projecting flange 25 adapted to overhang the end of the casing A. The V-shaped plate section of the shoe presents two longitudinally extending, laterally inwardly converging friction faces 30—30 on its outer side, which together form a friction surface of V-shaped, transverse cross section. The friction faces 30—30 of each shoe are engaged with two adjacent friction faces 13—13 of the casing A. The inner side of the head 24 of each shoe presents a flat wedge face 26 engaged with and correspondingly inclined to one of the wedge faces 22 of the combined wedge and spring follower B. At the bottom end, each shoe C has a laterally outwardly projecting, central stop lug 27 for limiting outward movement of the shoe with respect to the casing A, as hereinafter pointed out. As shown in Figure 2, the shoes are arranged within the casing so that the lugs 27—27—27 of the three shoes are engaged within the slots 14—14—14 of the casing and are engageable with the shoulders 15—15—15 to limit outward movement of the shoes. In Figure 5, the three shoes are turned through an angle of 60 degrees about the central longitudinal axis of the casing with respect to the position shown in Figure 2, with the lugs 27 of the shoes engaged within the slots 16—16—16 of the casing and cooperating with the shoulders 17—17—17 to limit outward movement of said shoes. As will be evident, the shoes have greater travel inwardly of the casing when assembled therewith, as shown in Figure 5, than when assembled as shown in Figure 2. In other words, by providing the staggered shoulders 15 and 17, the shock absorber is made adjustable for long or short travel of the shoes C—C—C.

Adjacent the bottom end thereof, each shoe is further provided with laterally outwardly extending lugs 31—31 projecting from opposite sides of the same. The lugs 31—31, 31—31, and 31—31 of the three shoes are spaced apart slightly in the fully expanded condition of the lower end of the shoe structure and are engageable with each other to restrict inward tilting of the bottom end portions of the shoes and thus prevent collapse of the bottom end portion of the shoe structure.

The shoes C—C—C are recessed on their inner sides at the upper ends, as indicated at 28—28—28, to provide a seat for the usual spring centering lug of the top spring follower plate of a cluster of truck springs.

The spring resistance D comprises a relatively light inner coil and a heavier outer coil, both coils bearing at their upper ends on the bottom face 21 of the combined wedge and spring follower B. The inner coil is seated on the boss 20 of the bottom wall 10 of the casing A and the outer coil is seated on said bottom wall and surrounds the boss 20.

In assembling the mechanism, the spring resistance D and the combined wedge and spring follower B are first placed within the casing A by insertion of the parts through the open top end of the casing. The shoes C—C—C are then inserted around the combined wedge and spring follower B, two of the same being first placed in position and forced inwardly against the combined wedge and follower B, resisted by the spring D, until the lugs 31—31 at the lower ends of the two shoes reach a position spaced below either set of stop shoulders 15 or 17 of the casing A, which spacing exceeds the overall vertical height of the lugs 31—31 of the remaining shoe, to provide clearance for the lugs of the latter to permit inward tilting of said third shoe to engage the lug thereof underneath the selected stop shoulder 15 or 17. While the two shoes are held in the position described, the third shoe is inserted within the casing with its bottom end tilted inwardly, and depressed until the retaining lug 27 thereof passes beneath the level of the selected shoulder 15 or 17. This shoe is then righted to engage the lug 27 thereof in back of the cooperating stop shoulder of the casing. The pressure is then removed from the two shoes first applied, permitting the spring D to project the same outwardly and engage the lugs 27—27 thereof with the selected stop shoulders 15 or 17 and bring the lugs 31—31, 31—31, and 31—31 of the three shoes into horizontally aligned position to hold the bottom end of the shoe structure against inward collapsing.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes are forced downwardly with respect to the casing A, against the resistance of the combined wedge and spring follower B. The shoes are thus wedged apart by the combined wedge and spring follower B into tight frictional engagement with the friction surfaces of the casing. During inward movement of the shoes on the friction surfaces of the casing, high frictional resistance is produced to snub the action of the truck springs. Upon recoil of the truck springs and upward movement of the top spring plate of the truck spring cluster, the expansive action of the spring resistance D returns all of the parts to their normal positions, outward movement of the shoes being limited by engagement of the lugs thereof with the chosen set of stop shoulders of the casing.

I claim:

1. In a friction shock absorber, the combination with a casing open at one end; of interior friction surfaces at said open end of said casing; friction shoes in lengthwise sliding engagement with said friction surfaces; interior stop shoulders on said casing; stop lugs on the shoes engageable with certain of said stop shoulders to limit outward movement of said shoes, said stop shoulders being arranged in two sets, with either of which sets said lugs of the shoes are engageable, said two sets of shoulders being staggered lengthwise of the casing with respect to each other; a combined wedge and spring follower block in wedging engagement with the shoes; and a spring within said casing yieldingly opposing inward movement of said combined wedge and spring follower block.

2. In a friction shock absorber, the combination with a casing open at one end; of interior friction surfaces at said open end of said casing; a set of circumferentially spaced, interior stop shoulders on said casing, spaced a predetermined distance inwardly of the open end of said casing; a second set of circumferentially spaced, interior stop shoulders on said casing, alternated with said first named shoulders and spaced inwardly of said open end of the casing a distance different from said first named shoulders; friction shoes in lengthwise sliding engagement with said friction surfaces, said shoes having stop lugs thereon which, in one position of said shoes, are engageable with one of said sets of shoulders for limiting outward movement of said shoes, and in another position of said shoes are engageable with the other of said sets of shoulders to limit outward movement of said shoes to an extent different from the amount of movement when said lugs are engaged with said first named set of shoulders; a combined wedge and spring follower block in wedging engagement with the shoes; and a spring within said casing yieldingly opposing inward movement of said block.

3. In a friction shock absorber, the combination with a friction casing open at one end; of interior friction surfaces at said open end of said casing; a set of three circumferentially spaced, interior stop shoulders on said casing; a second set of three circumferentially spaced, interior stop shoulders on said casing, alternated with said first named shoulders, said shoulders of said second named set being circumferentially spaced 60 degrees from said first named shoulders, said shoulders of said two sets being staggered with respect to each other lengthwise of the casing; friction shoes in lengthwise sliding engagement with said friction surfaces, said shoes having stop lugs thereon engageable with said stop shoulders of said casing, said lugs being engageable with one of said sets of stop shoulders when the shoes are in one position and engageable with the other set of shoulders when turned about the axis of said casing through an angle of 60 degrees; a combined wedge and spring follower in wedging engagement with said shoes; and a spring within said casing yieldingly opposing inward movement of said combined wedge and spring follower.

4. In a friction shock absorber, the combination with a friction casing open at one end, said casing being of hexagonal, interior, transverse cross section, and presenting six interior friction surfaces, extending lengthwise of the same; of interior stop shoulders on said casing at three alternate corners thereof spaced inwardly from said open end of the casing a predetermined distance; interior stop shoulders on said casing at the remaining alternate corners thereof, spaced inwardly from said open end of the casing a distance different from said first named stop shoulders; friction shoes in lengthwise sliding engagement with said friction surfaces; stop lugs on said shoes engageable with said first named stop shoulders of the casing when said shoes are in one position to limit outward movement of said shoes, to a certain extent, said lugs of said shoes being engageable with said second named shoulders of the casing when the shoes are rotated through an angle of 60 degrees about the axis of the casing from said first named position; a combined wedge and spring follower in wedging engagement with said shoes; and a spring within said casing yieldingly opposing movement of said combined wedge and spring follower inwardly of the casing.

5. In a friction shock absorber, the combination with a casing open at one end, said casing having interior friction surfaces at said open end; of a friction shoe structure comprising a plurality of friction shoes arranged symmetrically around the central longitudinal axis of the mechanism, and having sliding frictional engagement with the interior walls of the casing; a combined wedge and spring follower in wedging engagement with the shoes; laterally outwardly projecting guide lugs on opposite sides of each of said shoes, adjacent the inner end thereof, engageable with the guide lugs of the adjacent shoes to hold the inner end of the shoe structure against inward collapsing; and spring means yieldingly opposing inward movement of said combined wedge and spring follower.

6. In a friction shock absorber, the combination with a casing open at one end, said casing having interior friction surfaces at said open end; of interior stop shoulders at said open end of the casing; a friction shoe structure comprising a plurality of friction shoes arranged symmetrically around the central longitudinal axis of the mechanism and having sliding frictional engagement with the interior walls of the casing; stop lugs projecting laterally outwardly from the lower end portions of said shoes and engageable with said shoulders of the casing to limit outward movement of said shoes; a combined wedge and spring follower in wedging engagement with said shoes; laterally outwardly projecting guide lugs on opposite sides of each of said shoes, adjacent the lower end thereof, engageable with the guide lugs of the adjacent shoes to hold the lower end of said shoe structure against inward collapse; and spring means yieldingly opposing inward movement of said combined wedge and spring follower.

WILLIAM E. WITHALL.

REFERENCES CITED

The following references are of record in the file of this patent:

UNITED STATES PATENTS

| Number | Name | Date |
|---|---|---|
| 754,670 | Miner | Mar. 15, 1904 |
| 1,862,764 | O'Connor | June 14, 1932 |
| 2,147,034 | Heitner | Feb. 11, 1939 |
| 2,220,074 | Blattner | Nov. 5, 1940 |
| 2,413,295 | Dath | Dec. 31, 1946 |